Sept. 21, 1943.  A. M. GOODLOE  2,329,987

STRAINER DEVICE FOR LIQUIDS

Filed June 30, 1942

INVENTOR.
Alfred M. Goodloe,
BY George D. Richards,
ATTORNEY.

Patented Sept. 21, 1943

2,329,987

UNITED STATES PATENT OFFICE 2,329,987

STRAINER DEVICE FOR LIQUIDS

Alfred M. Goodloe, Montclair, N. J., assignor to Metal Textile Corporation, West Orange, N. J., a corporation of Delaware Application June 30, 1942, Serial No. 449,120

3 Claims. (Cl. 210—169)

This invention relates to improvements in strainer devices for separating suspended solids from liquids passed therethrough, whereby to clarify or cleanse said liquids for initial or repeated use.

The invention has for an object to provide a novel construction of strainer device equipped with liquid pervious bag-like filtering means, and means for detachably supporting the latter in operative relation to the cleansed liquid discharge outlets of the strainer device, whereby the same may be quickly and easily detached and removed at will for cleansing and replacement.

The invention has for a further object to provide a novel construction of strainer device comprising a main casing having comparatively coarse perforate wall sections to admit the liquid to be strained into its interior with preliminary straining effect to first remove coarse solid matter therefrom, and interiorly disposed bag-like filtering means through which the preliminary strained liquid passes with final straining effect to complete the removal of solid matter comprising finer solids, means being provided to detachably support said bag-like filtering means with the open discharge end or ends thereof in communication with the cleansed liquid discharge means leading out and away from said main casing.

The invention has for another object to provide in a liquid strainer device, an open-work frame insertable within bag-like filter means so as to operatively spread and support the latter, said frame including inner and outer clamp means to engage and grip marginal portions of the mouth end of a bag-like filter means, and means cooperative with the outer clamp means for both moving the same into filter member gripping relation to the inner clamp means, and at the same time affixing the frame and its supported filter means in operative relation to a reservoir or casing wall and the cleansed liquid discharge means issuing therefrom.

Other objects of this invention, not at this time more particularly enumerated, will be understood from the following detailed description of the same.

An illustrative embodiment of this invention is shown in the accompanying drawing, in which.

Similar characters of reference are employed in the above described views, to indicate corresponding parts.

Figure 1:
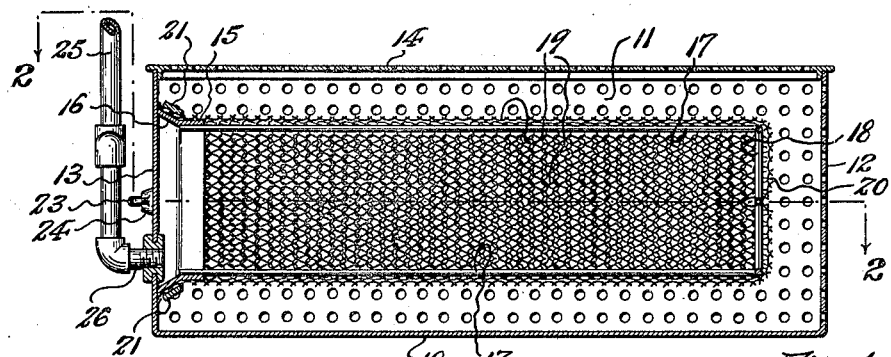
Fig. 1 is a longitudinal vertical sectional view of a strainer device according to this invention; said section being taken on line 1—1 in Fig. 2.
Figure 2:
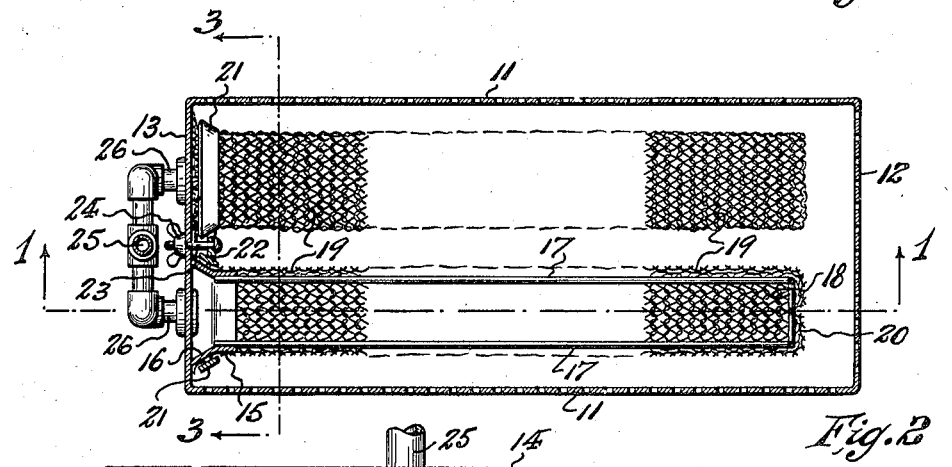
Fig. 2 is a horizontal sectional view of said strainer device, said section being taken on line 2—2 in Fig. 1.
Figure 3:
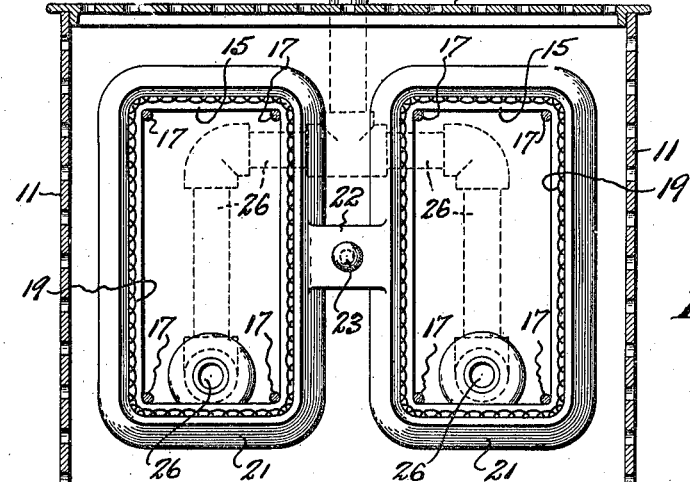
Fig. 3 is a transverse sectional view of said strainer device, taken on line 3—3 in Fig. 2, but drawn on an enlarged scale.

In the illustrative embodiment of strainer device, according to this invention, as shown in said drawing, the same comprises an upwardly open casing formed by a bottom wall 10, perforate side walls 11, a perforate end wall 12, and an imperforate opposite end wall 13. The open top of said casing is normally closed by a removable cover member 14, which is preferably perforated for admission of liquid therethrough. The casing thus provided is of polygonal shape, but it will be understood that it may be made in other shapes if desired. Said casing may be made of any suitable material, such e. g. as sheet or cast metal, wood, plastic material, etc.

Within the interior of the casing are disposed one or more filter devices which are arranged in spaced relation to the perforate walls of said casing, and, if more than one, in spaced relation to each other. Each such filter device comprises an open-work frame of suitable cross-sectional shape, usually rectangular, the same being formed by an inner clamp collar 15, the outer marginal portions of which are outwardly and forwardly inclined so as to provide a flared free end portion 16. Affixed to said collar 15, as e. g. by welding the same thereto, are rearwardly extending longitudinal frame bars 17, disposed to form the lateral corners of the frame. Said frame bars 17 are connected together at their rear ends by transverse end bars 18. Arranged to be removably mounted on the frame is a bag-like filter element 19, which is open at one end but closed by a bottom portion 20 at its other end. Said bag-like filter element may be made of any suitable flexible liquid pervious material, preferably, however, comprising a mesh fabric of selected mesh size according to the particle size of solids suspended in and desired to be removed from a given liquid to be subjected to straining or filtering treatment. The mesh walls of the bag-like filter element may comprise one or more plies of the selected mesh fabric, although for purposes of simplified illustration the filter element walls, as shown in the drawing, are formed by a single fabric ply. For many purposes, it has been found advantageous to make the bag-like filter element from a metallic mesh fabric knitted from round or flat wire and in suitable mesh size. Such knitted metallic mesh is strong and durable, and is easily flexed and stretched so as to be efficiently spread by the supporting open-work frame when applied thereto. To apply the filter element 19—20 to the frame, the latter is inserted through the open mouth of the former and passed therethrough until its closed bottom end is stopped against the end of said frame. The walls of the filter element will be smoothly spread and supported by the frame, so that substantially the entire area of said walls will be exposed to unobstructed passage of the liquid to be strained therethrough, and the marginal portions of the mouth end of the filter element will be arranged to overlie the inner clamp collar 15 and its flared free end portion 16, ready to be clamped thereto by an outer clamp collar or ring 21 which is passed over the rear end of the frame supported filter element and slid forward until it engages said marginal mouth portions of the latter, so as to firmly clamp or bind the same between the inner and outer clamp collars. Preferably said outer clamp collar or ring 21 is flared to conform to the flared shape of the portions 16 of the inner clamp collar.

The frame supported filter element is inserted within the interior of the casing, and so disposed that its open mouth end is caused to abut the imperforate end wall 13 thereof, in communication with cleansed liquid discharge means which is affixed to and leads outwardly from said end wall 13, releasable means, cooperative with the outer clamp collar or ring 21 being provided for drawing toward and firmly holding and securing the mouth end of said frame supported filter element in abutment against said imperforate end wall of the casing, while at the same time strongly urging said outer clamp collar or ring 21 toward the flared end of the inner clamp collar, whereby to tightly grip and hold the bag-like element against shifting or displacement from its supporting frame.

In a preferred arrangement, as shown, a plurality of frame supported filter elements are provided in parallel spaced apart relation, and the outer clamp collars or rings 21 thereof are interconnected by a transverse draw lug or ear 22 bridging adjacent sides thereof. Passed through said draw lug or ear 22 is a headed bolt 23, the threaded end of which projects through and exteriorly of the imperforate end wall 13 of the casing. Threaded onto said bolt 23 is a thumb nut 24 which, when screwed home against the outer face of said end wall 13, draws the outer clamp collars or rings 21 into filter element clamping relation to their associated inner clamp collars 15—16, while at the same time drawing the latter into affixed abutment upon the inner face of said casing end wall 13, thus releasably holding the open discharge mouths of the filter elements in operative communication with the cleansed liquid discharge means which issues from said casing end wall.

The cleansed fluid discharge means may be variously constructed, but ordinarily comprises a discharge conduit or pipe 25, having intake means suitably coupled to and through said casing end wall 13. Said discharge conduit or pipe 25 may be led to any place at which the cleansed liquid is desired to be delivered or utilized, and usually a suitable pump means (not shown) will be included in the line thereof for forcing circulation of the liquid through the filter device. When a plurality of filter elements are provided, as shown, the intake of said discharge conduit or pipe 25 may be divided into the required number of branches 26, each being connected to the casing for communication with the interior of one of the filter elements.

The interior of each filter element provides a comparatively large capacity plenum or collecting chamber to contain cleansed liquid against which a circulating pump may efficiently draw.

It will be obvious that the perforate walls of the casing may be provided with perforations of size best suited to act with preliminary straining effect upon the liquid entering therethrough into the casing interior, whereby to exclude entrance of comparatively large solid particles or foreign matter which may be suspended or entrained in the liquid to be strained. The bag-like filter elements will be of selected mesh size best suited to remove all suspended solids from the treated liquid so that the latter is thoroughly strained and cleansed upon passage therethrough.

The filter elements are easily and quickly removable for relieving the same from accumulated solids collecting thereon in use. To remove the filter elements for cleansing, the thumb nut 24 is removed from the bolt 23, and the cover 14 is opened to give access to the filter elements. Removal of the thumb nut 24 frees the bolt 23 so that the filter devices may be backed away from the casing end wall 13, and thereupon lifted out through the opened top of the casing. When the filter devices are thus removed, the outer clamp collars or rings 21 may be slid rearwardly and endwise over the frame supported filter elements and removed, whereupon, the mouths of the bag-like fiilter elements 18—19 being freed, said elements may be quickly and easily slipped off the frames. After removal, the bag-like filter elements may be thoroughly washed to remove therefrom all solid matter accumulated therein, after which cleansing the same may be again mounted on their supporting frames, and again returned and operatively assembled within the casing ready for repeated use.

It will be apparent that the instant invention therefore provides a very simple and efficient strainer device, wherein bag-like filter elements of mesh fabric may be quickly and easily removably mounted in service position, subject to removal for cleaning and replacement.

In cases where no preliminary straining effect is desired, the frame supported bag-like filter elements may be directly mounted upon and in connection with a liquid reservoir wall in communication with the discharge outlet of said reservoir; in which case the described perforate casing may be eliminated.

The strainer of this invention is especially useful for service in liquid circulating means employed in connection with machine tools in connection with the operation of which it is desired to apply cooling, lubricating or other treating liquid to an operating tool and the material being worked thereby, so that the liquid thus circulated may be efficiently freed from any accumulation of lint, chips, dirt or other foreign substances or particles carried back with the liquid from the operating tool into the liquid supply reservoir in which the strainer would be submerged so that recirculated liquid must first pass therethrough.

It will be understood that some changes may be made in the strainer device structure shown in the drawing and above described without departing from the scope of this invention as defined by the following claims. It is therefore intended that all matter contained in the above description or shown in the accompanying drawing shall be interpreted as illustrative and not in a limiting sense.

I claim:

1. The combination with a wall having cleansed liquid discharge means issuing therethrough of strainer means detachably connected with said wall, said strainer means comprising a plurality of open-work frames each having a flared clamp collar at one end thereof, said frames being arranged in parallel spaced relation, a bag-like filter element of mesh fabric adapted to be drawn over each frame so as to be spread and supported thereby, the marginal portions bounding the mouths of said filter elements being disposed to overlie the frame clamp collars, an outer clamp ring cooperative with each frame supported filter element to bind said marginal mouth portions thereof respectively to the frame clamp collars, bridging means connecting adjoining clamp rings, a draw bolt anchored to said bridging means to extend through said wall, and manipulatable nut means on the bolt operative to both draw said clamp rings into filter element gripping positions and the supporting frames into affixed abutment against said wall, with the open mouths of their supported filter elements disposed in communication with said cleansed liquid discharge means.

2. A strainer structure comprising a casing having a removable cover member to close the same, certain of the walls of said casing being perforated to pass liquid therethrough into the casing interior, at least one wall of said casing being imperforate, cleansed fluid discharge means connected to and through said imperforate wall to issue from the interior of said casing, strainer means adapted to be detachably affixed to said imperforate wall, said strainer means comprising an open-work frame having a flared clamp collar at one end, a bag-like filter element of mesh fabric adapted to be drawn over said frame so as to be spread and supported thereby, the marginal portions bounding the mouth of said filter element being disposed to overlie said clamp collar, an outer clamp ring adapted to be passed over the frame supported filter element and disposed to bind said marginal mouth portions thereof against said clamp collar, and releasable holding means cooperative with said imperforate wall and clamp ring adapted to both draw the latter into filter element gripping relation and the supporting frame into affixed abutment against said imperforate wall, with the open mouth of the supported filter element disposed in communication with said cleansed liquid discharge means.

3. A strainer structure comprising a casing having a removable cover member to close the same, certain of the walls of said casing being perforated to pass liquid therethrough into the casing interior, at least one wall of said casing being imperforate, cleansed fluid discharge means connected to and through said imperforate wall to issue from the interior of said casing, strainer means adapted to be detachably affixed to said imperforate wall, said strainer means comprising, a plurality of open-work frames each having a flared clamp collar at one end thereof, said frames being arranged in parallel spaced relation, a bag-like filter element of mesh fabric adapted to be drawn over each frame so as to be spread and supported thereby, the marginal portions bounding the mouths of said filter elements being disposed to overlie the frame clamp collars, an outer clamp ring cooperative with each frame supported filter element to bind said marginal mouth portions thereof respectively to the frame clamp collars, bridging means connecting adjoining clamp rings, a draw bolt anchored to said bridging means to extend through said imperforate wall, and manipulatable nut means on the bolt operative to both draw said clamp rings into filter element gripping positions and the supporting frames into affixed abutment against said imperforate wall, with the open mouths of their supported filter elements disposed in communication with said cleansed liquid discharge means.

ALFRED M. GOODLOE.